United States Patent [19]

Wright et al.

[11] 3,929,744

[45] Dec. 30, 1975

[54] POLYMERIC ISOCYANATES AND PROCESS FOR MAKING SAME

[75] Inventors: Howard J. Wright, Kansas City, Mo.; Kenneth E. Harwell, Merriam, Kans.

[73] Assignee: Cook Paint and Varnish Company, Kansas City, Mo.

[22] Filed: Oct. 31, 1974

[21] Appl. No.: 519,660

[52] U.S. Cl............................ 260/80.73; 260/77.5; 260/77.5 CH; 260/86.1 N; 260/89.7 S
[51] Int. Cl.$^2$ .................. C08F 26/02; C08F 126/02; C08F 226/02
[58] Field of Search 260/89.7 S, 77.5 AT, 77.5 CH, 260/86.1 N, 80.73

[56] References Cited
UNITED STATES PATENTS

| | | | |
|---|---|---|---|
| 2,334,476 | 11/1943 | Coffman................. | 260/80 NC UX |
| 2,729,560 | 1/1956 | House et al..................... | 260/89.7 S |
| 3,759,857 | 9/1973 | Bracke.......................... | 260/29.6 H |

OTHER PUBLICATIONS

Arcus, C. L., J. Poly. Science, Vol. 8, No. 4, pp. 365–370, (1952).

*Primary Examiner*—Joseph L. Schofer
*Assistant Examiner*—F. R. Cervi
*Attorney, Agent, or Firm*—Cushman, Darby & Cushman

[57] ABSTRACT

A process for preparing an isocyanate-functional polymer which comprises reacting a sterically hindered amide polymer with a hypochlorite and recovering the isocyanate-functional polymer from the reaction mixture. The isocyanate-functional polymer may be used in coating compositions and can be cross-linked with active hydrogen containing moieties, e.g., polyols or polyamines.

15 Claims, No Drawings

POLYMERIC ISOCYANATES AND PROCESS FOR MAKING SAME

The present invention relates to the preparation of useful isocyanate-functional polymers. The polymers of the invention have a variety of uses typical of products containing reactive isocyanate groups. However, one important area of use for the present products is in coating compositions which can be cured at low temperatures. Because of energy considerations, for example, there is an important need for the provision of industrial coatings which may be baked at low temperatures or possibly even cured at ambient temperatures.

Coating compositions containing resins made from isocyanate monomers of intermediates are attractive candidates for low temperature applications because isocyanate groups will usually react quite readily, even at ambient temperature, with amines, acids, alcohols or other compounds containing active hydrogens to form highly useful coatings or films. However, there are certain very practical limitations on the availability and use of such systems. Thus, to be satisfactory for industrial uses, the isocyanate-functional resin which is used should be made from isocyanates which are aliphatic or cycloaliphatic in nature. Additionally, the isocyanates must be nonvolatile and must have at least a functionality of two. As a result of these restrictions, very few isocyanate functional materials are available for use and those that are, are very expensive. Most isocyanates are made by reaction between diamines, which are expensive, and phosgene which is difficult to handle. Thus, some fundamentally new way of making isocyanate-functional materials is desirable if these materials are to be effectively used in industrial coating systems.

A particularly difficult problem with prior art isocyanate-functional polymers made from an isocyanate monomer or intermediate is the fact that such products usually contain free isocyanate monomer which tends to volatilize and otherwise makes handling difficult.

The principal object of the present invention is to provide a new process for making isocyanate-functional polymers. A more particular object is to provide such a process which obviates the prior art problems mentioned above.

Another object is to provide a process for making isocyanate-functional polymers which is easy to carry out and substantially reduces the expense of preparing such polymers.

Another object is to provide new isocyanate-functional polymers which are free from unbound isocyanate groups and are otherwise highly desirable for use in coating compositions capable of being baked or cured at low temperature.

Other objects will also be evident from the following description of the invention.

Broadly speaking, the process of the invention comprises reacting a sterically hindered amide polymer with a hypochlorite and recovering the resulting isocyanate-functional polymer. The success of the invention is due, in large measure, to the finding that, by using a sterically hindered amide polymer for reaction with sodium hypochlorite or like hypochlorite, a polymer containing reactive isocyanate groups attached directly to the polymer backbone chain can be obtained and recovered in useful yield.

The Hofmann reaction, which involves the reaction of an amide with sodium hypochlorite to produce primary amines, is well known. It is also known that in this reaction an isocyanate is formed as an intermediate. The reaction involved can be illustrated as follows:

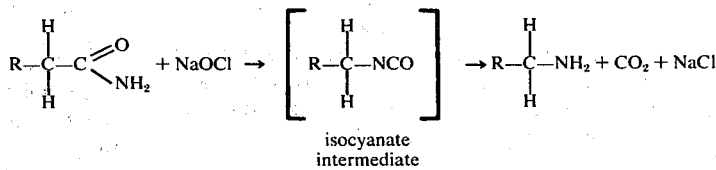

The reaction proceeds rapidly so that, even though an isocyanate intermediate is formed, it has not previously been considered possible or feasible to terminate the reaction at the intermediate stage as a way of preparing recoverable isocyanates. The present invention is based, however, on the finding that, if the amide reactant is a sterically hindered amide polymer, as hereinafter described, a useful yield of isocyanate can be obtained and isolated. The results are particularly effective using a tertiary alpha-carbon amide polymer although useful amounts of isocyanate polymers can also be realized using secondary alpha-carbon amide polymers as reactants.

Without intending to be bound by any type of reaction theory, it appears that the hypochlorite-amide reaction described herein proceeds in several steps as follows producing a series of intermediate compounds leading to the desired product.

Step 1:

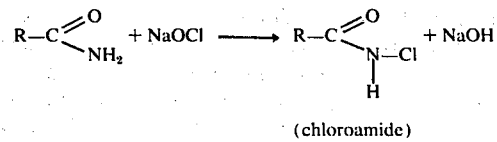

(chloroamide)

Generally, this step gives the best yield of the chloroamide in the temperature range of 2° to 4°C. with a period of 2 to 3 hours when using an 11–14% sodium hypochlorite solution and a 5% amide solution.

Step 2:

The chloroamide is an acidic compound which immediately forms a salt with the free sodium hydroxide in the reaction mixture as follows:

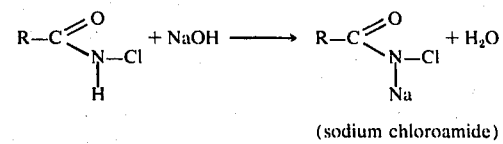

(sodium chloroamide)

The free chloroamide may be isolated from the reaction mixture by acidifying it with a mineral acid (while cold) to prevent salt formation with the sodium hydroxide.

Step 3:
The sodium chloroamide is an unstable compound and is thermally decomposed when the reaction mixture is heated as follows:

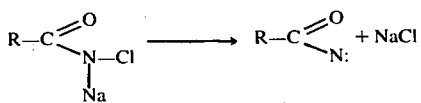

Heating causes NaCl to split off the compound and separate, leaving the nitrogen atom with two unsatisfied valence electrons. This step occurs best in the temperature range of 20°–30°C. during a period of 1 to 2 hours, in the same reaction medium.

The resulting amide with the unsaturated nitrogen atom undergoes an immediate and spontaneous rearrangement to produce an isocyanate compound, i.e., the Hofmann Rearrangement, as follows:
Step 4:

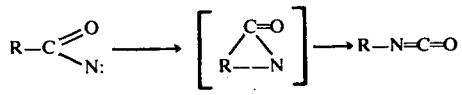

The amide with an unsaturated nitrogen as shown in brackets is a theoretical concept and the compound has not been isolated. The overall effect of the rearrangement is a movement of the alkyl group R from the carbonyl carbon to the nitrogen atom and the formation of the nitrogen to carbon double bond.

As noted, the invention requires the use of a sterically hindered amide polymer for reaction with the hypochlorite. Polymers which may be called secondary alpha-carbon amide polymers or tertiary alpha-carbon amide polymers may be used therein.

By secondary alpha-carbon amide polymers is meant those polymers which have at least one amide group $CONH_2$ attached to a carbon atom of the polymer backbone or chain wherein the carbon atom of the backbone or chain has only one hydrogen directly attached to it. A tertiary alpha-carbon amide polymer, which is preferred for use herein, is one in which the carbon carrying the amide group has no hydrogen attached to it. Primary alpha-carbon amide polymers will not work satisfactorily for present purposes since this type of amide reacts so rapidly with hypochlorite to form amines that any intermediate isocyanate which is produced is converted almost immediately to the amine and amine derivatives and cannot be isolated in useful amounts.

Representative polymers for use herein include copolymers of acrylamide with any vinyl monomer which is free from hydroxy and —COOH groups, e.g., styrene, methyl styrene and alkyl acrylates and/or methacrylates such as ethyl acrylate, ethyl methacrylate, methyl methacrylate, butyl methacrylate, hexyl methacrylate and/or acrylonitrile. The composition of such copolymers will vary but usually will comprise from 5–95% by weight of acrylamide and 95–5% of comonomer of comonomers. Similar copolymers of methacrylamide may be used, it being understood that th acrylamide polymers are secondary alpha-carbon amide polymers as described herein, i.e., the amide groups therein are attached to secondary carbon atoms along the polymer chain whereas the methacrylamide polymers have the amide groups attached to tertiary carbons. Copolymers are preferred but it is also possible, according to the invention, to use acrylamide and methacrylamide homopolymers.

The molecular weight of the amide polymer can be varied over a very wide range and is not critical. Thus, polymers of molecular weights of 10,000 and beyond, e.g., 500,000–1,000,000 can be used and it is also possible to effectively use low molecular weight polymers such as dimers and trimers depending on the nature of the isocyanate desired. These polymers can be prepared in conventional manner by polymerizing the monomers in the presence of an appropriate catalyst and solvent, e.g., benzoyl peroxide or azobisisobutyronitrile and xylene, respectively.

The polymer can be reacted with any alkali metal hypochlorite although sodium hypochlorite is preferred. Reaction temperatures up to about 30°C. or even higher may be used although advantageously the reaction temperature does not exceed 15°C. and usefully is in the range of about 0° to 15°C. or even lower.

Reactant ratios can be varied. However, preferably the hypochlorite is used in molar excess. The amount of such excess is not critical but usually it is not practical or economic to use more than a 200–300% molar excess.

The reaction is advantageously carried out in the presence of an inert organic solvent, e.g., xylene, lower alkanols or the like. Conveniently, the reaction is carried out by mixing together a solution of the tertiary alpha-carbon amide polymer, advantageously the polymer solution obtained by polymerizing the monomers in an appropriate solvent, with an aqueous solution of sodium hypochlorite or the equivalent, while maintaining the temperature at the desired level. This gives an aqueous emulsion containing the isocyanate polymer from which water and at least part of the solvent is preferably removed, for example, by distillation or by emulsion breaking to give a stable anhydrous isocyanate resin.

Emulsion breaking is preferred to distillation and is used when it can be accomplished. If the emulsion can be broken, an organic layer containing the isocyanate resin and a water layer will form. Draining out the water layer also removes the by-product, sodium chloride, since it will be dissolved in the water.

It has been found that emulsions containing a significant percentage of water soluble solvents can be broken by freezing and thawing. Examples of such water soluble solvents are dioxane, isopropanol, and sulfolane. For freezing, the emulsions may be cooled to −30° to −40°C. or lower with solid carbon dioxide.

Some emulsions can be broken by the addition of small amounts of surface active agents. An emulsion from a xylene solution of a methacrylamide-butylmethacrylate copolymer can be broken by acidification with hydrochloric acid followed by addition of 1–2% of an alkyl dimethylbenzyl ammonium chloride solution.

Although most of the water and salt (95–99%) are removed with the water layer obtained in emulsion breaking, traces remain in the resin layer and must be removed. The resin solution is then dehydrated by vacuum distillation and the residual salt is removed by filtration. By first removing the bulk of the water and salt by emulsion breaking, the distillation and filtration become much easier and faster and much less isocyanate is lost.

The isocyanate products are suitable for reaction with active hydrogen containing compounds to form useful coatings and films. Thus, for example, an amine such as ethylene diamine or hexamethylene diamine can be mixed with the isocyanate resin derived from methacrylamide polymers as described herein in amounts sufficient to provide one amine group per isocyanate group. Paint films can be made by coating these solutions to uniform thickness on glass plates. After curing overnight at room temperature (e.g. 20°–25°C) the films are found to be hard and tough, tack free to touch, insoluble, clear and glossy, with very strong adherence to glass. The rate of reaction between the amine and isocyanate groups is such as to provide highly useful curing rates for paint films and coatings.

Using an acrylamide copolymer with styrene for illustrative purposes, the reaction with sodium hypochlorite proceeds as follows:

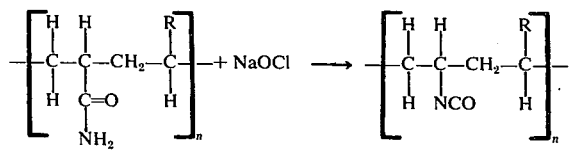

where R is phenyl and $n$ is an integer. The corresponding product using a copolymer of methacrylamide with styrene can be shown as follows:

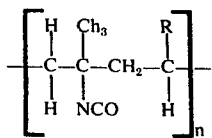

It will be appreciated that the polymer structures shown above are theoretical and are only given for purposes of illustration since, in practice, the positioning of the amide and isocyanate groups will most likely be randomly located along the polymer chain. However, the structures given show that the products involved are polymers which include aliphatic isocyanate groups along the chain attached to a secondary or tertiary carbon. The products are substantially non-volatile and may have any desired functionality depending on what percent of amide is reacted with the hypochlorite. There may, therefore, be cases where the polymer includes both amide and isocyanate groups attached to the polymer backbone.

It has been found that both acrylamide and methacrylamide copolymer solutions gave good yields of isocyanate polymer when stirred with a molar excess of sodium hypochlorite at 0° to 15°C. for a short time. These copolymers form very stable emulsions during the reaction which may present separation problems but water present can usually be removed by azeotropic distillation at, for example, 50° to 70°C.

The isocyanate products obtained from the acrylamide copolymers, i.e., the secondary alpha-carbon amides, appear to be moderately stable at room temperature but may tend to cross-link to a stiff gel during the distillation of the water. Hence, caution must be taken to avoid premature gelling at this stage.

High yields of isocyanates are obtained from the methacrylamide copolymers, and there is no difficulty with gelling or undesired viscosity increases during the water distillation. Thus, stable, anhydrous resins containing considerable amounts of isocyanate may be made from methacrylamide copolymers.

The yield of isocyanate from methacrylamide copolymers appears to increase rapidly as the reaction temperature is lowered from 30°C. to near 0°C. Even at the lowest temperatures, however, the reaction is exothermic and fast requiring less than three hours in time. The isocyanate yield appears to be increased by the use of large molar excesses of sodium hypochlorite with yields of up to 70% or more being obtained. The use of other hypochlorites, e.g., calcium hypochlorite, may be used in place of the sodium hypochlorite, but lower yields are obtained.

It is to be noted that isocyanate yields given here are calculated on the basis of the weight of amide monomer used in the polymerization mixture. Yields on this basis range between 70 and 45%. Yields based on the actual amide content of the polymer are higher because it is known that some of the primary amide groups are lost during polymerization. When peroxide catalysts are used with mercaptan compounds, the amount of primary amide in the polymer is found to be greatly reduced, apparently by reaction with one or both of these compounds. Also, considerable amounts of primary amide are lost through imide formation. Especially stable imides are easily formed between adjacent amide groups on the same chain but may also be formed by other pairs of amide groups.

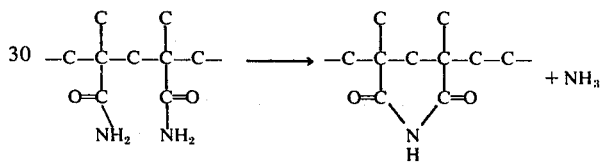

Imide groups are disadvantageous because they consume sodium hypochlorite and produce no isocyanate. Accordingly, imide groups should be avoided as far as possible.

The anhydrous, isocyanate resins derived from methacrylamide react at room temperature with glycols, dibasic acids and amines such as ethylenediamine and hexamethylenediamines. Addition of a small amount of these compounds, e.g., one or more amines, to the isocyanate resin causes it to gel within a few minutes and the isocyanate bands are removed from the infrared spectra.

The invention is illustrated, but not limited, by the following examples wherein parts and percentages, unless otherwise indicated, are by weight.

EXAMPLE 1

A resin (XA-3001-MX) was prepared by polymerizing together monomers in the ratio of 7.5g acrylamide, 12.5g styrene, and 30.0g butylmethacrylate while in a mixture of solvents in the ratio of 25.25g xylene, 7.5g n-butyl alcohol, and 11.25g "cellosolve". Peroxide catalysts were used in a conventional procedure. The product contained 56.2% solids and had a Gardnet-Holdt Gardner-Holdt viscosity of Z6.

Samples of 10g each of the above resin solution were weighed into different flasks and each diluted with 15 ml. of toluene to reduce the viscosity. An aqueous solution containing 12.5% sodium hypochlorite, NaOCl, was added to the different resin solutions in amounts to provide ½, 1 and 1½ mols of hypochlorite per mol of amide groups. The mixtures were shaken vigorously at room temperature. In each case a stable emulsion formed and there was a slight warming indicating an exothermic reaction.

Infrared spectra were taken of the solutions before addition of the sodium hypochlorite and at periods of 30 minutes, 1.3 hours, and 18 hours afterwards. Organic isocyanate groups, R—N=C=O, show a strong, sharp, and highly characteristic absorption band in the infrared spectrum near 2260 CM$^{-1}$. Before reaction with sodium hypochlorite the resins solution showed no absorption bands in this region of the spectrum. The appearance of the 2260 cm$^{-1}$ band is a positive indication of the presence of isocyanate compounds, and the strength of the band is indicative of the amount of isocyanate compound in the mixture.

After 30 minutes each of the samples showed a medium strength isocyanate band. After 1.3 hours there appeared to be only a slight increase in the strength of the isocyanate band showing that the formation was essentially completed during the first 30 minutes. After 18 hours much of the isocyanate was still present showing that only a part of it had reacted with the water which was present. The "1½ mol" sample showed a stronger isocyanate band than the "1 mol" sample, which was stronger than the "½ mol" sample, showing that the amount of isocyanate produced increased with the amount of sodium hypochlorite used.

EXAMPLE 2

This example illustrates the removal of water from the reaction mixture by distillation.

The resin (XA-3001-MX), 100g equivalent to 0.118 mols of amide, and 100g of toluene were weighed into a 1-liter, 3-neck flask. The flask was fitted with a stirrer, thermometer, reflux condenser, and a liquid decanting trap. The flask was cooled with a pan of ice and water or heated with a heating mantle as needed.

With the resin solution at 10°C, 54 ml of sodium hypochloride (equivalent to 0.177 mols or 1½ mols/amide) also at 10°C, was added. The temperature rose to 23°C within 5 minutes but was soon lowered with ice to 9°C. Infrared spectra showed that isocyanate had formed. After 30 minutes no more isocyanate had formed, the viscosity of the mixture was increasing, and its pH was 7-8.

The reactor was arranged for vacuum distillation and the water azeotrope was distilled out at 45°-50°C. At this point the resin solution had formed a very stiff gel which could not be stirred.

EXAMPLE 3

Example 2 was repeated except that 1 mol of NaOCl per amide was used with a lower reaction temperature, 8°-17°C. An effort was made to distill out the water at a lower temperature to avoid gellation. After 30 minutes of reaction with NaOCl an infrared spectrum was taken and this showed the presence of isocyanate. The reactor was then arranged for vacuum distillation.

The distillation was started at 32 mm Hg pressure and 24°C. No water collected in the distillate trap indicating that the toluene water azeotrope does not form at this pressure and temperature. The pressure was adjusted to 36 mm Hg, giving a temperature of 26°C. Only a very small amount of water came over under these conditions. At 70 mm Hg pressure and 40°C, the water distilled over rapidly. After about one-half of the water had distilled out, the resin formed a stiff gel which could not be stirred.

An infrared spectrum of the gelled resin showed a greatly reduced amount of water, most of the amide band at 1660 cm-1 were gone, and a considerable amount of isocyanate was still present.

EXAMPLE 4

A resin was prepared by polymerizing together monomers in the ratio of 7.5g methacrylamide, 12.5g styrene, 15g butyl methacrylate, and 15g butyl acrylate. The resin was polymerized in a conventional way using a benzoyl peroxide catalyst. The resin was used in a xylene solvent. The solution contained 52.6% solids, had a Gardner-Holt viscosity of O, and contained 15% methacrylamide based on solids.

A sample of this resin solution was shaken vigorously with an equal volume of an aqueous 12.5% NaOCl solution. A very stable emulsion formed immediately. After 20 minutes at room temperature an infrared spectrum of the emulsion showed a medium strength isocyanate band at 2260 cm$^{-1}$. After 1½ hours a fairly strong (0.46 absorbance units) isocyanate band was seen. Very little change was seen in the infrared spectrum of the emulsion after 112 hours at room temperature, except for a reduced amount of water.

This example shows that the amide groups on the methacrylamide polymer are easily converted, to isocyanate groups which appear to be much more stable in the presence of water than are other isocyanate groups. The emulsion was only partly separated after standing for 3 days.

EXAMPLE 5

A resin was prepared by polymerizing together monomers in the ratio of 3.5g methacrylamide, 12.5g styrene, 17.0g butyl methacrylate, and 17.0g butyl acrylate, using a benzoyl peroxide catalyst. The resin was used in a xylene solution containing 55.0% solids and having a Gardner-Holdt viscosity of U-V. Theoretically 7% of the solids was methacrylamide.

A reactor consisting of a 1-liter, 3-neck flask and fittings as in example 2 was used. The resin solution, 500g, and a 12.5% aqueous sodium hypochlorite solution, 75 ml, (32% molar excess over amide) were put in the flask at room temperature, 24°C, and stirred together. Within 5 minutes the temperature rose to 40°C and the reactor was quickly cooled with a pan of cold water to 20°-25°C. A stable emulsion formed.

An infrared spectrum of the resin solution before reaction showed the —NH$_2$ amide bands in the 3200-3400 cm$^{-1}$ region, a strong ester carbonyl band at 1740 cm$^{-1}$ and the amide carbonyl band near 1680 cm$^{-1}$. After 30 minutes at near 20°C, the emulsion showed a strong isocyanate band at 2260 cm$^{-1}$ and the amide bands were greatly reduced in strength.

The theoretical amount of water was removed by azeotropic distillation under vacuum at 60°-68°C. After water stripping the resin solution contained a dispersion of solid sodium chloride. To remove this a part of the resin solution was vacuum filtered and the other part was pressure filtered. Both filtrations were slow due to the high viscosity of the resin. The vacuum filtration gave a very clear solution. Infrared spectra of the filtered solutions showed the absence of water and amide. The isocyanate band at 2260 cm$^{-1}$ was present and strong. Three days later the infrared spectra of the solutions was again taken. The isocyanate band was still present and strong showing that a stable isocyanate containing resin had been produced.

The isocyanate, —N=C=O, content of the resin solutions was determined by a commonly used titration method. In this method a sample of the resin is reacted with a measured amount of a standard n-butyl amine solution and the excess, unreacted n-butyl amine is determined by titration with a standard hydrochloric acid solution. The analysis obtained showed (solids basis);

vacuum filtered solution, 1.69% NCO, or 0.402 meq/g.

pressure filtered solution, 1.43% NCO, or 0.340 meq/g.

The theoretical NCO content for conversion of all of the amide to NCO is 3.45%. A 49% yield is indicated but this may not be the actual yield, because the peroxide catalyst used for polymerization appears to destroy a portion of the amide. Thus, the conversion of amide to isocyanate may be much higher than indicated. The isocyanate content may be used to calculate the amount of crosslinking agent needed.

EXAMPLE 6

The curing properties of the resin prepared in Example 5 were examined. Portions of the resin were stirred at room temperature (20°–25°C) with arbitrary amounts of ethylenediamine and hexamethylene diamine. With ethylene diamine there was a slight warming on mixing at room temperature and the viscosity increased greatly. An infrared spectra taken about an hour after mixing showed no isocyanate indicating that it had all reacted with the ethylenediamine. With hexamethylene diamine the resin formed a stiff gel after stirring for a few minutes, and an infrared spectra taken about 1½ hours later showed more than one-half of the isocyanate had reacted with hexamethylene diamine.

Solutions containing 10% of ethylenediamine and 10% hexamethylene diamine in methylethyl ketone were mixed with the resin solution in amounts to provide one amine group per isocyanate group. Films of each mixture were coated on glass plates and allowed to cure overnight at room temperature. Compared to a film in which no amine was added the cured films were harder, showed greater solvent resistance, they adhered strongly to the glass, and were not sticky to touch. All of the films were clear and glossy.

Although the isocyanate groups derived from methacrylamide react slowly with water, this example shows that they have adequate reactivity toward amines to be useful under ordinary conditions. Thus, molecular crosslinking and film curing occurs at normal and useful rates.

EXAMPLE 7

A resin solution similar to that in Example 1 was prepared. This resin contained 5% acrylamide based on solids and was dissolved in xylene to give a solution containing 56.0% solids and having a Gardner-Holt viscosity of V-heavy.

A sample of calcium hypochlorite, Ca(OCl)$_2$, was ground in a ball mill to a fine powder. Analysis showed this calcium hypochlorite to contain 58.4% available chlorine or 16.4 milliequivalents per gram.

A 100g sample of the resin solution was mixed with 3.0g of the Ca(OCl)$_2$, 50% molar excess, powder for 18 hours at room temperature. Infrared spectra taken during this period showed no reaction.

A 100g sample of the resin solution was mixed with 3.0g of the Ca(OCl)$_2$ powder and 15 ml of water. A stable emulsion-suspension formed immediately. An infrared spectrum taken after 30 minutes at room temperature showed the presence of the isocyanate group but the yield appeared to be less than with sodium hypochlorite. Heating the solution briefly to 70°C caused an apparent increase in isocyanate, but at 99°C, the isocyanate was lost. Heating did not cause the emulsion to break.

This example shows that hypochlorite compounds other than sodium hypochlorite may be reacted with amide groups to produce isocyanate compounds. Organic hypochlorites such as t-butyl hypochlorite might also react in this way in the presence of metal ions to permit the formation of chloroamide salts.

EXAMPLE 8

A resin was prepared from a mixture of monomers in the ratio of 3.5g methacrylamide, 12.5g styrene, 17.0 butylmethacrylate, and 17.0g butylacrylate, in a xylene solvent. The polymerization mixture also contained 4.5g of benzoylperoxide and 1.0g of lauryl mercaptan. Reaction of this resin solution with sodium hypochlorite in the above described way produced no isocyanate. Further examination of this resin by infrared spectra showed that it contained no amide groups apparently because the mercaptan and/or peroxide destroyed these. Increasing percentages of methacrylamide in the polymers lead to excessively high viscosities and the lauryl mercaptan was used to reduce the viscosity through molecular weight reduction.

Another resin (A-3015-M) was prepared from a mixture of monomers in the ratio 5.0g methacrylamide, 12.5g styrene, 16.5g butyl methacrylate, and 16.0g butyl acrylate, in a xylene solvent. The catalyst was 4.5g of benzoyl peroxide. Infrared spectra showed amide groups to be present in this resin, but reaction with sodium hypochlorite gave a 45% yield of isocyanate, suggesting that a part of the amide may have been lost before reaction.

Thus, it appears that the amide group may react with the peroxide catalyst, especially if mercaptans are present, causing a loss of a significant amount of amide. For this reason azobisbutyronitrile was used to catalyze all of the following resins.

EXAMPLE 9

A sample of the methacrylamide resin in xylene solution prepared as in Example 4 contained 54% solids (10% methacrylamide) and had a Gardner-Holdt viscosity of Z-heavy. It was reacted with sodium hypochlorite after a diluent, dioxane, was added to reduce its viscosity.

A 500 ml, 3-neck flask was fitted with a stirrer, thermometer, reflux condenser, an addition funnel, and an ice-water pan for the reaction with sodium hypochlorite. For water removal by azeotropic distillation the flask was fitted with a reflux water trap, a heating mantle and connected to a vacuum source.

Infrared spectra of the resin taken before and after dilution with dioxane showed the characteristic amide bands at 3340, 3180 and 1670 cm$^{-1}$.

Resin solution, 200g was weighed into the reactor and stirred with 100 ml of dioxane. The addition funnel was charged with 45 ml (50% molar excess) of a 12.5% NaOCl solution. The reactor was cooled to 10°C and the sodium hypochlorite solution (also cold) was added over a 15 minute period. A temperature rise to 14°C was seen. Thirty minutes from the beginning the temperature was 7°C and an infrared spectrum of the emulsion was taken. A medium strength isocyanate band was seen. After another 30 minutes the infrared spectra was the same, showing that the reaction was completed.

All of the water and most of the dioxane were distilled out as an azeotrope at 65°–75°C. The dried resin showed no water, a small amount of dioxane, and a strong isocyanate band in the infrared spectrum.

The resin was further diluted with about 100 ml of dioxane and filtered on a vacuum filter to remove the suspended salt. After filtration, analysis by the titration method showed 2.24% NCO based on solids. The theoretical NCO content for a 100% conversion of amide to isocyanate was 4.94%. Thus, a 45% yield was obtained.

EXAMPLE 10

A resin was made from a mixture of monomers in the ratio of 5.0g methacrylamide, 12.5g styrene, 16.5g butyl methacrylate and 16.0, butyl acrylate in a solvent of approximately equal weights of toluene and sulfolane. Lauryl mercaptan 0.5g and azobisisobutyronitrile 3.0g were used to avoid decomposition of the amide groups. At 55% solids (10% methacrylamide) the resin solution had a Gardner-Holdt viscosity of H, and a zero acid number.

This resin solution (200g equals 0.117 moles amide) was reacted with a sodium hypochlorite solution (20.6 ml equals 0.117 moles) as described in Example 1 above. The reaction temperature varied between 18° and 30°C and the reaction was complete in less than 15 minutes. The water was removed by distillation at near 60°C. In this solvent most of the salt settled out and was removed by decanting rather than filtering. An infrared spectrum of this product showed a moderately strong isocyanate band and much unreacted amide. A quantitative infrared analysis indicated 0.20% NCO based on solids, or a 4.1% yield.

EXAMPLE 11

Example 10 was repeated except that the reaction temperature was kept between 11° and 16°C. The water removed by distillation at 75°C and the salt produced settled out. Infrared analysis indicated 0.48% NCO before distillation and 0.23% NCO after distillation for a maximum yield of 9.8%.

EXAMPLE 12

Example 10 was repeated except that the reaction temperature was kept between 4° and 7°C. Infrared analysis of the product indicated 0.50% NCO before distillation and 0.36% NCO after distillation, for a maximum yield of 10.2%.

Examples 9 to 12 show that the yield of isocyanate increases significantly as the reaction temperature is lowered from 30° to 6°C. The examples also show that only a part of the amide reacts when one mol of sodium hypochlorite is used, and a significant amount of the isocyanate is lost during distillation of the water. Thus, lower temperatures and larger amounts of sodium hypochlorite are desirable to increase the yield.

EXAMPLE 13

A resin was made from a mixture of monomers in the ratio of 7.5g methacrylamide, 12.5g styrene, 15.0g butyl methacrylate, and 15.0g butyl acrylate, in a solvent mixture of 20.0g sulfolane and 26.5g of xylene. The catalysts used was 3.0g of azobisisobutyronitrile and 0.5g of lauryl mercaptan. The reaction solution contained 51.2% solids (15% methacrylamide) and had a Gardner-Holdt viscosity of M. Infrared spectra of this resin showed all of the bands characteristic of amide and ester groups in good strength.

The apparatus of Example 9 was used. The resin solution (200g equals 0.176 moles of amide) was put into the reactor and 44.4 ml (equal to 0.176 mols) of sodium hypochlorite solution was put into the addition funnel. The sodium hypochlorite solution was added over a period of 45 minutes with the reaction temperature held between 3° and 7°C. Infrared analysis indicated 1.7% NCO (based on solids) at this time. The reaction mixture was allowed to warm up to room temperature over a period of 30 minutes at which time infrared analysis indicated 1.9% NCO. The reaction mixture was then acidified with a large excess of acetic acid and water removed by vacuum distillation at 65°–80°C. A major portion of the amide remained unreacted.

EXAMPLE 14

Example 13 was repeated using 200g (equal to 0.176 mols of amide) of resin solution and 105.0g NaOCl solution (equal to 0.352 mols), i.e. two mols of NaOCl per amide group. The sodium hypochlorite solution was added over a period of 1 hour while keeping the reaction temperature between 2° and 6°C. An infrared analysis indicated 3.3% NCO at this time. The reaction mixture was allowed to warm up to room temperature, 22°C, over a period of 45 minutes. At this time an infrared analysis indicated 3.5% NCO. The free sodium hydroxide in the reaction mixture was neutralized by the addition of 2g of glacial acetic acid, using pH paper as the indicator. The water was removed by vacuum distillation at 39° to 58°C (58 mm Hg to 39 mm Hg) over a period of 2 hours.

Infrared analysis of the dry product indicated 3.6% NCO and showed that a considerable amount of the amide remained missing. Thus, a conversion of 48% was obtained, although the actual yield is higher due to the unreacted amide.

EXAMPLE 15

Example 13 was repeated using 200g (equal 0.176 mols amide) of resin solution and 124g (equal to 0.528 mols) of sodium hypochlorite solution, i.e. 3 mols NaOCl per mol of amide. The sodium hypochlorite solution was added over a period of 35 minutes with reaction temperatures in the range of 2°–10°C. At this point infrared analysis indicated 4.35% NCO. Over a period of 40 minutes the reaction mixture was warmed to 29°C, at which time infrared analysis indicated 5.2% NCO (versus a theoretical maximum of 7.43% NCO).

The reaction mixture was neutralized with 3.0g of acetic acid and the water removed by vacuum distillation at 37°–65°C over a period of almost 2 hours. Infrared analysis of the final product showed only traces of amide remaining and indicated 3.25% NCO. Therefore, some isocyanate was lost during the water distillation. Thus, the peak yield in this example was 69.9% and the conversion was almost complete.

The large molar excess of sodium hypochlorite required for complete conversion of the amide indicates that the hypochlorite may be decomposed or consumed in other ways.

EXAMPLE 16

A copolymer resin solution was prepared by polymerizing together 120 grams of methacrylamide, 200 g styrene, 240 g butylmethacrylate and 240 grams butylacrylate. The polymerization was catalyzed with 48 g of azobisisobutyronitrile and 8 g of lauryl mercaptan. The solvent for the polymer consisted of 424 grams of xylene and 320 g of sulfolane. The polymer solution had the following properties, 51.2% nonvolatiles, 0.20 acid number, 8.63 lbs./gallon density and a Gradner Holdt viscosity of M.

This resin solution (200 g = 0.176 mols amide) was put into a 500 ml flask fitted with a stirrer, thermometer, addition funnel and set in an ice water cooling bath. Its viscosity was reduced by stirring in 20 ml of toluene. A sodium hypochlorite solution, 44.4 ml = 0.176 mols, was added from the addition funnel as quickly as possibly while keeping the temperature between 3° and 5°C. After all of the sodium hypochlorite had been added, samples of the reaction mixture was taken periodically and analyzed for isocyanate, i.e. —NCO, content. A drop of the reaction mixture was spread uniformly on an infrared transparent plate and allowed to dry to a film at slightly above room temperature. The infrared spectrum of the film showed an absorption band at 2,260 cm$^{-1}$ due to the isocyanate group and a band at k,460 cm$^{-1}$ due to absorption of methylene groups, along with numerous other absorption bands. The absorbance of the isocyanate band relative to the constant absorbance of the methylene band is a direct measure of the amount of isocyanate present in the copolymer. Thus, NCO absorbance/HC absorbance = amount of NCO in unspecified units.

The reaction mixture was maintained at 3°–5°C. until the NCO/HC ratio reached a maximum. Then the reaction mixture was warmed to 25°–30°C. and the pH adjusted to 7 with hydrochloric acid. A small amount, 1–2%, of a 50% $C_{12}$–$C_{14}$-alkyl dimethylbenzyl ammonium chloride solution added to break the emulsion. The water layer which formed was withdrawn and the resin layer dehydrated by vacuum distillation at 35°–40°C. An infrared spectrum of this resin solution showed some unreacted amide and an NCO/HC ratio of 0.57.

EXAMPLE 17

The procedure of Example 16 was repeated using a molar ratio of one-half and one-third of amide to sodium hypochlorite. The effect of increasing amounts of sodium hypochlorite is shown in the following table.

| Example No. | Amide/NaOcl | NCO/HC |
|---|---|---|
| 16 | 1/1 | 0.57 |
| 17 | 1/2 | 1.50 |
| 17 | 1/3 | 1.65 |

EXAMPLE 18

Example 16 was repeated using a one-third ratio of amide/NaOCl while holding the temperature between −5° and −10°C. during addition of the NaOCl for one additional hour. When the reaction mixture was warmed, a strong uncontrollable exotherm occurred. This indicates that the amide-NaOCl reaction had not yet occurred and that a reaction temperature of −5° to −10°C is undesirably low. The emulsion was broken by freezing to −46°C. and thawing. Infrared analysis of the dehydrated resin solution showed a low yield of isocyanate, NCO/HC = 0.8.

EXAMPLE 19

A copolymer resin similar to that described in Example 16 was prepared except that 10% methacrylamide was used rather than 15% and the sulfolane was replaced by several other solvents. The amide was chlorinated at 0° C. to 5° C. using a molar ratio of ⅓ amide NaOCl. After addition of all the NaOCl solution, the mixture was stirred for ¼–½ hour and warmed to 25°–30°C. Acidification of the reaction mixtures released some chlorine gas showing that an excessive amount of sodium hypochlorite had been used. Each batch was then cooled to −30°C. in a dry ice bath to freeze it. On thawing, some of the emulsions broke and others did not. The emulsion behavior along with the isocyanate yield is shown below.

| Batch | Solvent | Phase Separation | NCO/HC |
|---|---|---|---|
| A | Xylene | No | 0.95 |
| B | Cellosolve Acetate | Yes | 0.63 |
| C | Xylene | No | 0.73 |
| D | Toluene | No | 1.08 |
| E | Cellosolve Acetate | Yes | 1.17 |
| F | Methyl Amyl Acetate | No | 0.79 |
| G | Dichlorobenzene and Dioxane | No | 0.70 |
| H | Xylene, Dioxane and Sulfolane | Yes | 0.57 |
| I | Xylene and Dioxane | No | 0.56 |
| K | Xylene and Dioxane | No | 0.56 |

This table shows that the isocyanate formation reactions go well in a wide variety of solvents and that the only emulsions which were broken by freezing and thawing were those containing a larger percentage of watersoluble solvents.

EXAMPLE 20

A copolymer resin was prepared by polymerizing together 138 g of methacrylamide (15%) and 792 g of butyl methacrylate (84%) using a solvent mixture of 400 g of isopropyl alcohol and 1,550 g of xylene. After polymerization the isopropanol was removed by distillation, giving a resin solution with the following properties: 23.6% nonvolatiles, 0.4 acid number, Gardner-Holdt viscosity A and density 7.57 lbs/gallon.

The amide was chlorinated at 0°–5°C. using a ⅓ molar ratio of amide/NaOCl with a 12.5% NaOCl solution. The reaction mixture was acidified with hydrochloric acid at 4° C., with no intermediate warming of the reaction mixture. Infrared analyses were run at different times on the reaction mixture as described above and no isocyanate bands were seen. The chloromaide surely formed as in the above examples, but the sodium salt of the chloroamide was not present due to acidification of the mixture. This behavior substantiates the theory that isocyanate is produced by warming and decomposing a salt of the chloroamide and that warming the free chloroamide does not produce a significant amount of isocyanate.

The above procedure was repeated twice except that the reaction mixture was allowed to warm to 26°C. and held there for 30–45 minutes before acidification. Both infrared and titration analyses showed the usual amounts of isocyante was produced. A commercial surfactant, Polystep F-6 (ethoxylated alkyl phenol) 2% was used to break the emulsion of one bath and Hyamine 3500 1% was used with batch C. Polystep F-6 caused 50% of the emulsified water to separate and Hyamine 3500 caused 99% of the water to separate.

Data from the above three batches are compared in the following table.

| Batch No. | Acidification Temp. °C. | Infrared NCO/HC | Titration % NCO |
|---|---|---|---|
| A | 4° | 0 | — |
| B | 26° | 0.85 | — |
| C | 26° | 0.94 | 2.66% |

EXAMPLE 21

A copolymer resin was prepared from 92 g of methacrylanide (15%) and 528 g of butylmethacrylate (85%). Solution A consisted of 1,034 g of xylene and 60 g of azobisisobutyronitrile. Solution B consisted of 92 g of methacrylamide, 266 g of isopropanol, 528 g of butyl methacrylate and 20 g of lauryl mercaptan. Solution A was put into a stirred and heated reactor. Solution B was added over a period of 3 hours while the reactor temperature was 75° C-81° C. and then held for 4 hours. The isopropanol was then removed by distillation and xylene added to give a resin solution with the following properties: 19.1% nonvolatiles, acid number 1.0, Gardner-Holdt viscosity A-light and density 7.48 lbs./gallon.

A 5 liter reaction flask was set in a thermostatically regulated low temperature fluid bath which was cooled by mechanical refrigeration. The reaction flask was equipped with a stirrer, thermometer and a calibrated additional funnel. The above resin solution, 2,500 g = 800 millimols, of amide, was put in the flask and cooled to 2° C. The addition funnel was charged with 426 ml of a 12.5% sodium hypochlorite solution - 1,660 millimols of NaOCl. The sodium hypochlorite solution was added at a rate such that the exothernic heat of reaction maintained the temperature between 3°-5° C. This addition required about 30 minutes. The emulsion which formed was stirred for several hours at 3°-5° C. and a sample was taken every one-half hour for isocyanate analysis by the infrared method. When the isocyanate content no longer increased, this phase of the reaction was considered complete.

The reaction flask was then removed to an elelctric heating mantle and equipped with a stirrer, thermometer, and pH electrodes. The reaction mixture was heated to above room temperature during a period of 1½ hours. Further infrared analyses were made to determine when this reaction was completed. The pH of the reaction mixture which was now 12–12.5 was adjusted to a pH of 7 to 6.5 by the addition of hydrochloric acid. This neutralization reduced the rate at which the isocyanate reacts with water and assists in breaking the emulsion. Next 1% of the surfactant, Hyamine 3500, ($C_{12}$–$C_{14}$-alkyl dimethylbenzyl ammonium chloride) was stirred in. After sitting at room temperature for a number of hours, a water layer formed which contained 98–99% of the water present and most of the by-product, sodium chloride. The water phase was removed with suction through a dip tube. The reaction flask was arranged for vacuum distillation at 10–50 mm Hg. and 35° to 40° C. Dehydration left a small amount of suspended salt in the resin solution which has removed with the assistance of "super filter aid" on a pressure filter. The product was a clear, low viscosity resin. Infrared analysis showed an NCO/HC ratio of 0.885.

EXAMPLE 22

The procedure of Example 21 was repeated a number of times using different amounts of sodium hypochlorite relative to amide. In the following table the moles of amide per mole of sodium hypochlorite is listed along with the amount of isocyanate produced. The amount of isocyanate produced is measured by the infrared absorbance ratio of NCO/HC.

| Mols NaOCl / Mols Amide | Isocyanate NCO/HC |
|---|---|
| 1.50 | 0.70 |
| 1.75 | 1.10 |
| 2.00 | 1.35 |
| 2.25 | 1.31 |
| 2.75 | 1.28 |

Thus, it is seen that the maximum yield of isocyanate occurred when two mols of sodium hypochlorite are used per mol of amide. Presumably, excessive sodium hypochlorite causes a decrease in yield by reacting with isocyanate.

EXAMPLE 23

The procedure of Example 21 was repeated a number of times using the resin solution at 35% nonvolatile content and adding the sodium hypochlorite solution over a period of 1¼ to 2½ hours. A series of infrared analyses for isocyanate was made during and for some time after the addition of the sodium hypochlorite. This data showed that the isocyanate yield increased for one hour after the completion of the sodium hypochlorite addition and then decreased very slowly.

Thus, the best yield was obtained by stirring the reaction mixture for one hour at 3° to 5° C. after all of the sodium hypochlorite had been added. This gives a total reaction time of 2¼ to 3¼ hours.

EXAMPLE 24

The procedure of Example 23 was repeated a number of times to learn the optimum conditions for carrying out the section reaction, i.e, converting the chloroamide salt to isocyanate. For this system the best yields were found when the reaction mixture was heated from 4° to 30° C. or 35° C during a period of 15 minutes and then held at the higher temperature for 30 minutes to 45 minutes.

At the end of this period hydrochloric acid was added to adjust the pH from near 12 to 6.5.

EXAMPLE 25

An isocyanate containing resin was prepared according to Example 23. This resin solution contained 42.8% nonvolatile material which contained 2.66% isocyanate groups as determined by titration analyses. The usefulness of this resin in making crosslinked and noncrosslinked urethane polymers was demonstrated by reacting it with a number of amine and hydroxyl compounds.

The materials were simply mixed at room temperature and the progress of the reactions followed by observing the changes in physical properties and by infrared absorption analysis for isocyanate content.

The resin was mixed with a 20% solution of hexamethylene diamine in toluene using one mol of amine per mol of isocyanate. Within about one hour a stiff gel had formed a little later an infrared spectrum was taken which showed no isocyanate, i.e, complete reaction. A series of samples containing different amounts, all of less than one mol, of hexamethylene diamine were made. After 20 hours infrared analysis showed an amount of iscyanate remaining corresponding to the defiency of amine. This shows the specific reaction of amine with the isocyanate group.

Various hydroxyl compounds were reacted with this and other similar resins. The hydroxyl compounds used, the condition of the reaction, and the amount of isocyanate reacted are shown in the following table. The above described resin was used.

| Hydroxyl Compound | Temperature °C | Time, hours | —NCO Reacted% |
|---|---|---|---|
| Lauryl Alcohol (1) | 24° | 4.83 | 17.1 |
| Lauryl Alcohol (1) | 100° | 1.60 | 99.5 |
| 1,4-Butanediol (2) | 24° | 66 | 12 |
| 1,4-Butanediol | 100° | 6.3 | 44 |
| 1,6-Hexanediol | 100° | 5.3 | 60 |
| 1,6-Hexanediol | 100° | 6.7 | 75 |
| Polyhydroxyl - -Caprolactone | 100° | 2.0 | 36 |
| Caprolactone | 100° | 2.8 | 38 |
| Esterdiol - 204 * | 100° | 2.1 | 34 |
| Esterdiol - 204 | 100° | 2.8 | 39 |
| Polyhydroxyl Resin ** | 100° | 4.0 | 63 |

(1) Contains 2.11% of dibutyl tin dilaurate catalyst.
(2) Contains 0.164% dibutyl tin dilaurate catalyst.
\* A dihydroxyl aliphatic ester of molecular weight 204.
\*\* A copolymer resin of 2-hydroxyl ethylacrylate and butyl methacrylate.

As shown by the above examples, best results are obtained by reacting methacrylamide copolymers and a molar excess sodium hypochlorite at temperatures which preferably are not in excess of 15° C. with subsequent removal of water. Using these conditions, a stable essentially anhydrous isocyanate resin can be recovered from the reaction mixture in good yield, the project being curable in a variety of ways using any active hydrogen containing moiety with average functionality of two or greater to effect crosslinking, e.g., diamines, glycols, dibasic acids of polymers containing such functional groups.

While best results are obtained with the methacrylamide or tertiary alpha-carbon amide polymers, the isocyanate products prepared with the acrylamide or other secondary alpha-carbon amide polymers are also useful. These latter products are more difficult to separate from water without crosslinking or curing the isocyanate resin but with suitable precautions or by using the reaction product relatively quickly and/or without trying to remove water, useful products can be obtained.

In lieu of using acrylamide or methacrylamide polymers, other tertiary alpha-carbon or secondary alpha-carbon amide polymers may be used. For example, polyesters derived from methylol acid amides, e.g., α,α-dimethylol propionic acid amide and a dibasic acid, e.g., phthalic acid, may be used as the tertiary alpha-carbon amide polymer for reaction with hypochlorite as described herein.

It will be recognized from the foregoing that the invention offers several unique advantages. For one thing, the present process makes possible the preparation of polymers containing reactive isocyanate groups in a relatively simple and straightforward way compared to prior art procedures. Furthermore, in contrast to previously available isocyanate polymers, the isocyanate resins of the invention contain no free isocyanate monomer and are, therefore, easier to handle and otherwise work with.

Various modifications may be made in the invention as described above. Hence, the scope of the invention is defined in the following claims wherein:

What is claimed is:

1. A process for preparing an isocyanate-functional polymer which comprises reacting a secondary alpha-carbon or tertiary alpha-carbon amide polymer -having at least one —$CONH_2$ group attached directly to a secondary or tertiary carbon atom, respectively, in the polymer chain, with a hypochlorite and recovering the isocyanate-functional polymer thus formed from the reaction mixture.

2. The process of claim 1 wherein the polymer reactant is a tertiary alpha-carbon amide.

3. The process of claim 2 wherein the tertiary alpha-carbon amide polymer is a methacrylamide polymer.

4. The process of claim 3 wherein the hypochlorite is an alkali metal hypochlorite.

5. The process of claim 4 wherein the hypochlorite is used in molar excess.

6. The process of claim 1 wherein the reaction temperature does not excess 30° C.

7. The process of claim 1 wherein the reaction temperature does not exceed 15° C.

8. The process of claim 1 wherein the reaction temperature is between 0° and 15° C.

9. The process of claim 1 wherein the reaction is carried out in the presence of an inert organic solvent.

10. The process of claim 1 wherein the hypochlorite is sodium hypochlorite.

11. An isocyanate-functional polymer derived from a polymer containing an amide group attached directly to a secondary or tertiary carbon in the polymer backbone, the isocyanate-functionality replacing said amide group and said isocyanate-functional polymer being free from free isocyanate.

12. The polymer of claim 11 in substantially anhydrous form.

13. The polymer of claim 12 wherein the polymer containing the amide group is a methacrylamide polymer.

14. The reaction product of the polymer of claim 11 and an amine or polyol.

15. A process according to claim 1 wherein a copolymer of methacrylamide with a vinyl monomer free from hydroxy and —COOH groups is reacted with sodium hypochlorite in molar excess at a temperature up to about 30°C and in the presence of an inert organic solvent and the resulting isocyanate-functional polymer is recovered from the reaction medium.

* * * * *